United States Patent [19]
von Buelow et al.

[11] Patent Number: 5,206,876
[45] Date of Patent: Apr. 27, 1993

[54] GASDYNAMIC CO LASER

[75] Inventors: Hartwig von Buelow, Tuebingen; Eberhard Zeyfang, Reichenbach; Wolfram Schock, Boeblingen, all of Fed. Rep. of Germany

[73] Assignee: Deutsche Forschungsanstalt fuer Luft- und Raumfahrt e.V., Bonn, Fed. Rep. of Germany

[21] Appl. No.: 751,827

[22] Filed: Aug. 30, 1991

[30] Foreign Application Priority Data

Sep. 5, 1990 [DE] Fed. Rep. of Germany ....... 4028053

[51] Int. Cl.$^5$ .............................................. H01S 3/09
[52] U.S. Cl. ...................................... 372/90; 372/55; 372/83; 372/87
[58] Field of Search .............. 372/90, 55, 87, 81, 372/83

[56] References Cited

U.S. PATENT DOCUMENTS

Re. 29,103 1/1977 Wilson et al. ..................... 372/83

OTHER PUBLICATIONS

Krause and Maisenhalder, "Gasdynamic CO Laser with Closed-Cycle Gas Flow," *Applied Physics* 22, pp. 421–427, 1980.
Brunet and Mabru, "Improved Performance of an Electric-Discharge $N_2$-CO Mixing Laser," *Journal of Applied Physics*, vol. 46, No.7, pp. 3683–3684, Jul. 1975.
Brunet and Mabru, "Electrical CO-Mixing Gas-Dynamic Laser," *Applied Physics Letters*, vol. 21, No. 9, pp. 432–433, Nov. 1972.
Vallach, et al., "Transverse Excitation Pulsed Laser in Gas-Dynamically Cooled Mixtures," *Applied Physics Letters*, vol. 20, No. 10, pp. 395–397, May 15, 1972.
Hugel, "High-Power Gas Lasers," *Laser and Optoelectronic*, No. 1, pp. 21–27, 1985.
Schall, et al., "CW Carbon Monoxide Laser with Microwave Excitation in the Supersonic Flow," *Journal de Physique*, Colloque C9, Supplement au No. 11, Tome 41, pp. C9-217-223, Nov. 1980.

*Primary Examiner*—James W. Davie
*Attorney, Agent, or Firm*—Barry R. Lipsitz

[57] ABSTRACT

In order to improve a gasdynamic CO laser comprising a gas supply means supplying a laser gas, an excitation region, in which the laser gas is excited, a supersonic nozzle arranged downstream of the excitation region and having the laser gas flowing therethrough and a laser-active region which is penetrated by a resonator beam path, such that it is possible to excite the laser gas in a more optimum manner, it is suggested that the laser gas be excited in the excitation region by means of a high-frequency discharge in a high-frequency discharge region and that the high-frequency discharge region end in front of the supersonic nozzle.

15 Claims, 2 Drawing Sheets

GASDYNAMIC CO LASER

BACKGROUND OF THE INVENTION

The invention relates to a gasdynamic CO laser comprising a gas supply means supplying a laser gas, an excitation region in which the gas is excited, a supersonic nozzle arranged downstream of the excitation region and having the laser gas flowing therethrough and a laser-active region penetrated by a resonator beam path.

A gasdynamic CO laser of this type is known from Applied Physics 22, pages 421–427 (1980). In this gasdynamic CO laser, the CO laser gas is excited in the excitation region by way of a glow discharge.

A glow discharge of this type is difficult to stabilize and requires, in addition, a cylindrical geometry of the exit region, whereby the laser gas flows through this cylindrical geometry along the cylindrical axis. On the other hand, a geometry of this type again requires the supersonic nozzle to be shaped in a manner which is not optimal with respect to the flow ratios.

The object underlying the invention is to improve a gasdynamic CO laser of the generic type such that it is possible to excite the laser gas in a more optimum manner.

SUMMARY OF THE INVENTION

This object is accomplished in accordance with the invention for a gasdynamic CO laser of the tYpe described at the outset in that the laser gas is excited in the excitation region by means of a high-frequency discharge in a high-frequency discharge region and that the high-frequency discharge region ends in front of the supersonic nozzle.

The advantage of the inventive solution is to be seen in the fact that the high-frequency discharge is easier to stabilize and that with the high-frequency discharge there is also the possibility of adapting the excitation region to the supersonic nozzle in an optimum manner. In addition, the fact that the high-frequency excitation region ends in front of the supersonic nozzle has the advantage that discharge inhomogeneities will not continue right into the laser-active region and lead to a deterioration of the beam quality which is always the case when the excitation region reaches into the supersonic nozzle.

In a particularly preferred embodiment of the inventive laser, the supersonic nozzle has a nozzle throat with a flow cross section in the shape of an elongated rectangle or slit with a long and a short cross-sectional side.

The advantage of such a shape for the flow cross section in the nozzle throat is that the supersonic nozzle can be short in design and so the design of wall boundary layers can be. disregarded. This means that a considerably more advantageous beam geometry for the resonator beam path can be achieved in the laser-active region and, with it, a substantially better exploitation of the excited laser gas.

It is particularly expedient for the high-frequency discharge region to extend in the direction parallel to the long cross-sectional side of the nozzle throat with essentially the dimension thereof.

This adaptation of the high-frequency discharge region leads to an optimum feeding of the supersonic nozzle with excited laser gas so that optimum flow ratios occur in the supersonic nozzle.

Furthermore, the high-frequency excitation region can also be adapted to the supersonic nozzle such that the high-frequency excitation region extends in the direction parallel to the short cross-sectional side of the nozzle throat over an entry height of an upstream inlet to the supersonic nozzle. This adaptation to the supersonic nozzle also contributes to providing the optimum flow ratios in the supersonic nozzle.

It is particularly expedient for the high-frequency excitation region to have at its output side a flow cross section which corresponds in form and dimensions to that of an upstream inlet to the supersonic nozzle.

Moreover, in an additional preferred embodiment the high-frequency excitation region has a constant flow cross section in the direction of flow. This contributes to providing constant flow ratios in the high-frequency excitation region and, therefore, to achieving a uniform excitation of the laser gas in the high-frequency excitation region. This means that when the laser gas leaves the high-frequency excitation region it is excited as homogeneously as possible.

Particularly good excitation conditions are offered by a constant rectangular flow cross section since, in this case, a constant field strength and a constant discharge flow density are present and so the excitation is homogeneous and stable.

The flow ratios between the high-frequency excitation region and the supersonic nozzle can be coordinated with one another particularly well when the high-frequency excitation region is arranged with a central axis in alignment with a central axis of the nozzle throat of the supersonic nozzle.

With respect to the type of high-frequency discharge, no details have so far been given. It is possible to couple the high frequency into the high-frequency discharge region in any desirable manner. It is, however, particularly advantageous for the high-frequency discharge to take place between two high-frequency electrodes located opposite one another.

A particularly favourable adaptation of the high-frequency discharge to the high-frequency excitation region can then be achieved with the high-frequency electrodes when the high-frequency electrodes generate an electrical field aligned approximately perpendicular to the direction of flow.

For this purpose, the high-frequency electrodes expediently extend parallel to the direction of the long cross-sectional side of the nozzle throat with, in particular, approximately the dimensions thereof in this direotion.

In order to excite the laser gas flowing through the high-frequency excitation region as uniformly as possible and as completely as possible, in a further advantageous embodiment a plurality of high-frequency electrodes are arranged one after the other in the flow direction in spaced relation to one another. In this way, the laser gas is excited by the high-frequency discharge, as it passes through the high-frequency excitation region, over as great a distance as possible.

In the simplest constructional possibility for realizing the high-frequency electrodes, these are designed in the shape of bars or strips.

In order, in addition, to stabilize the high-frequency discharge over a large area and to prevent the high-frequency discharge from becoming constricted, it is advantageous for the high-frequency discharge to be stabilized dielectrically.

This is carried out most expediently by providing the electrodes with dielectric covers.

From a constructional point of view, this can be accomplished most favourably by having the high-frequency discharge region enclosed between two dielectric plates which are located in planes aligned approximately parallel to the long cross-sectional side of the nozzle throat and define the flow cross section in the high-frequency discharge region in one direction.

It is particularly expedient for the high-frequency excitation region to be surrounded by an integral tube made of dielectric material which preferably extends coaxially to the central axis. This tube offers the possibility of sealing the high-frequency excitation region at its inlet and outlet sides with closed circumferential seals at the end faces of the tube. Moreover, the tube, as a self-supporting part, can also bear the electrodes.

Within the scope of the solution described thus far, no details have been given on how the optimum conditions in the high-frequency excitation region can be selected in order to bring about a high-frequency discharge which is, on the one hand, stable and covers a large area and, on the other hand, is as complete as possible.

In this respect, it is particularly favourable for the high-frequency excitation region to have the laser gas flowing therethrough at a pressure of approximately 400 to approximately 600 mbar, preferably approximately 500 mbar. Such high pressures can be achieved at high excitation capacities only with the inventive high-frequency excitation.

BRIEF DESCRIPTION OF THE DRAWING

Additional features and advantages of the invention are the subject matter of the following specification and drawings of one embodiment.

In the drawing

DETAILED DESCRIPTION OF THE INVENTION

Figure 1:
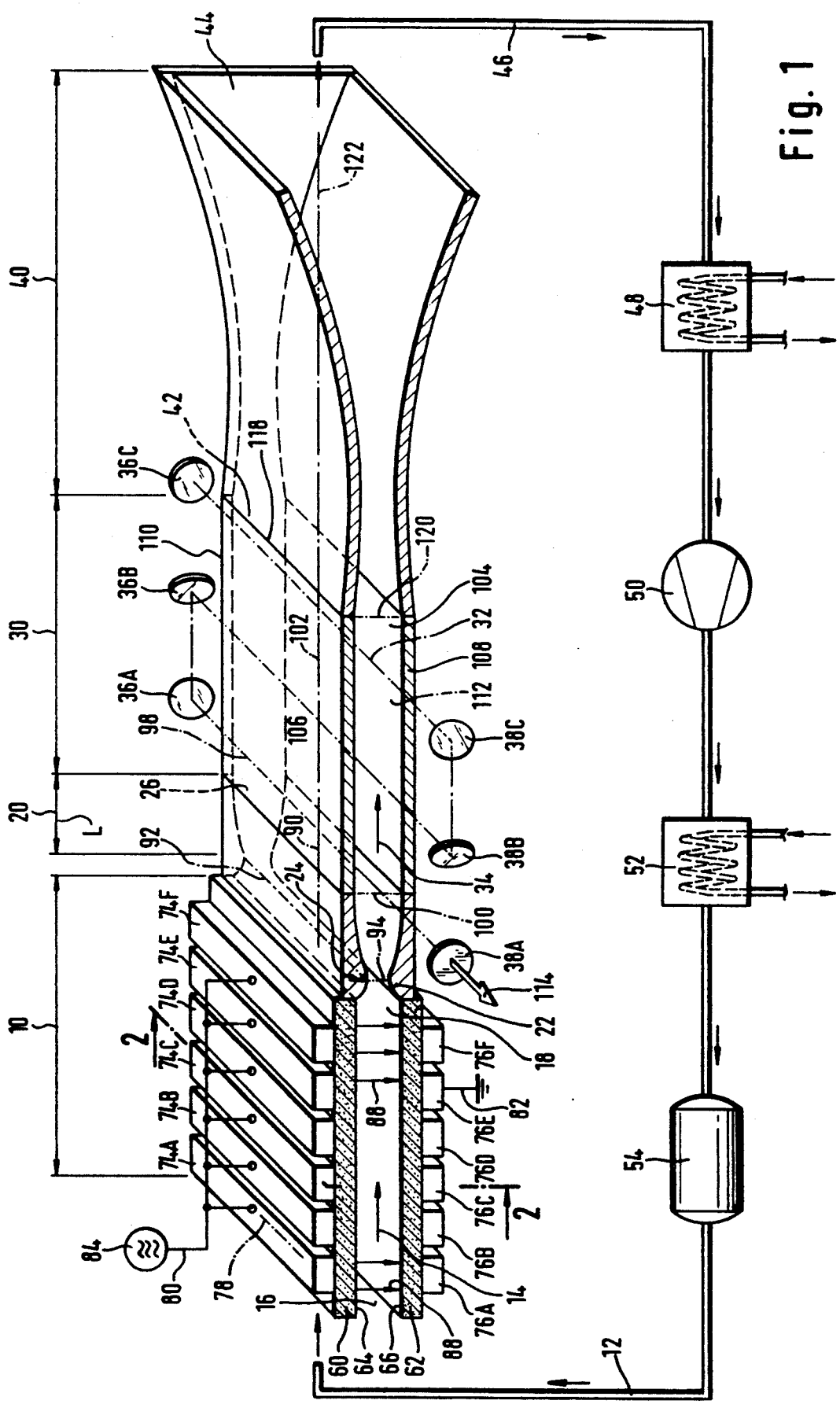
FIG. 1 is a perspective, laterally open illustration of one embodiment.

One embodiment of an inventive gasdynamic CO laser comprises an excitation region designated as a whole as 10, to which a laser gas is supplied via a supply line 12, this laser gas flowing through the excitation region in a direction of flow 14 from an inlet side 16 to an outlet side 18. A supersonic nozzle designated as a whole as 20 is connected to the outlet side of the excitation region 10 and its inlet 22 lies immediately adjacent the outlet side 18. Proceeding from the inlet 22 the nozzle tapers to a nozzle throat 24 and, following the nozzle throat 24, widens again as far as an outlet 26. A laser-active region 30 follows the outlet 26 of the supersonic nozzle 20 and this is penetrated by a resonator beam path 32 transverse to the direction of flow 34. This resonator beam path 32 is defined between two rows of mirrors 36A, B, C and mirrors 38A, B, C, these rows being arranged on opposite sides of the laser-active region 30.

This laser-active region 30 is followed by a diffuser designated as a whole as 40. Proceeding from an inlet 42, this diffuser tapers slightly and widens to an outlet 44, whereby the outlet 44 has a substantially larger cross section than the inlet 42.

The laser gas is conducted from this outlet 44 via a return line 46 to a heat exchanger 48, flows therethrough and is again compressed by a pump 50 arranged after the heat exchanger, flows through a heat exchanger 52 arranged after the pump 50 and, following the heat exchanger 52, through a $CO_2$ filter 54, from which the laser gas again flows into the supply line 12.

This forms, altogether, a laser gas circuit through which the laser gas constantly flows.

The excitation region 10 is limited by an upper dielectric cover 60 and a lower dielectric cover 62 which have facing surfaces 64 and 66 extending parallel to and spaced from one another and extend from the inlet side 16 as far as the outlet side 18.

Figure 2:
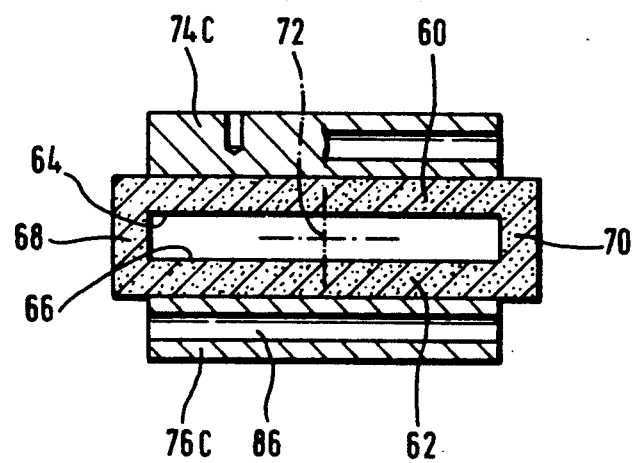
FIG. 2 shows a section along line 2—2 in FIG. 1.

As illustrated in FIG. 2, the excitation region 10 is closed on both sides by side walls 68 and 70 integrally formed on the dielectric covers 60 and 62.

Since the side walls 68 and 70 extend parallel to one another, a flow cross section of the excitation region 10 which is limited by the dielectric covers 60 and 62 as well as the side walls 68 and 70 is constant over the entire extension of the excitation region 10 from the inlet side 16 as far as the outlet side 18.

A central axis 72 of the excitation region 10 extends parallel and centrally to the dielectric covers 60 and 62 as well as to the side walls 68 and 70 and therefore parallel to the direction of flow 14.

Upper electrodes 74A to F and lower electrodes 76A to F are arranged on the sides of the dielectric covers 60 and 62, respectively, facing away from the excitation region 10. These electrodes are of a bar-shaped design and extend with a longitudinal axis 78 essentially at right angles to the central axis 72 and parallel to the surfaces 64 and 66 and preferably over the entire width of the dielectric covers 60 and 62 between the side walls 68 and 70. All the electrodes 74 or 76 seated on one of the dielectric covers 60 and 62, respectively, are connected to a common high-frequency line 80 and 82, respectively. The high-frequency line 80 leads to a high-frequency generator 84 which preferably supplies the electrodes 74 and 76 with a high frequency of 13.6 MHz. For the purposes of cooling, the electrodes 74 and 76, as illustrated in FIG. 2, are provided with a cooling duct 86 which penetrates the electrodes 74 and 76 again preferably parallel to the longitudinal direction 78.

In the direction of flow 14 the bar-shaped electrodes 74 and 76 are arranged in constant spaced relation, the individual electrodes 74A to F and 76A to F, respectively, being arranged opposite one another so that when the electrodes 74A to F and 76A to F are supplied with high frequency from the high-frequency generator 84 a high-frequency excitation of the laser gas occurs in the excitation region 10 via an electrical field 88. The electrical field 88 hereby defines a high-frequency excitation region which essentially begins immediately following the inlet side 16 and ends in front of the outlet side 18, i.e. it does not extend into the supersonic nozzle 20.

The laser gas is supplied to the excitation region 10 through the supply line 12 such that it is present in this region at a pressure of approximately 500 mbar at temperatures of 295 to 350 Kelvin, provided that the electrodes 74 and 76 are supplied with high frequency from the high-frequency generator. In the excitation region 10, the laser gas is completely excited essentially over the entire flow cross section due to this high frequency. The dielectric covers 60 and 62 bring about a substantially uniform distribution of the electrical field 88 over the entire excitation region 10 and prevent any constriction of the discharge to a punctiform or linear region.

After flowing through the excitation region 10 in the direction of flow 14, the laser gas passes into the supersonic nozzle 20 which also has a central axis 90 coaxially aligned, for its part, with the central axis 72 of the excitation region 10. The supersonic nozzle 20 has, in the region of its upstream inlet 22, a flow cross section which corresponds in size and shape to the flow cross section at the outlet side 18 of the excitation region 10. Proceeding from this inlet 22, the supersonic nozzle tapers, as already described, towards the nozzle throat 24. This throat has a long cross-sectional side 92 and a short cross-sectional side 94 which define the flow cross section in the region of the nozzle throat 24, i.e. in the region of the narrowest point of the supersonic nozzle 20. The long cross-sectional side 92 has the same extension as the excitation region 10 between the side walls 68 and 70 so that no alteration in the dimension occurs in a direction parallel to the long cross-sectional side 92. On the other hand, the dimension of the short cross-sectional side 94 is smaller than the space between the surfaces 64 and 66 of the dielectric covers 60 and 62.

Preferably, the long cross-sectional side 92 and the short cross-sectional side 94 each extend at right angles to the central axis 90 of the supersonic nozzle 20 so that the long cross-sectional side 92 is parallel to the surfaces 64 and 66 of the dielectric covers 60 and 62 whereas the short cross-sectional side 94 extends parallel to a space between the surfaces 64 and 66.

Following the nozzle throat, the supersonic nozzle 20 extends over a length L as far as the outlet 26. In accordance with the invention, the supersonic nozzle 20 is designed such that, proceeding from the pressure of 500 mbar prevailing at its upstream inlet 22, it generates at its downstream outlet 26 a pressure of, for example, 15 mbar or a laser gas temperature of 90 Kelvin. This means that the nozzle is designed as a so-called "short nozzle", the length of which is approximately 6 times the dimension of the short cross-sectional side 94 of the nozzle throat 24 or the height of the nozzle throat 24. Due to the design of the supersonic nozzle 20 as a short nozzle, boundary layers occur in the supersonic nozzle only to an insignificant degree and so these are of minor importance.

Preferably, a long cross-sectional side 98 at the outlet 26 is exactly the same length as the long cross-sectional side 92 of the nozzle throat 24 and a short cross-sectional side 100 is approximately 3 times as high as the short cross-sectional side 94 in the nozzle throat 24.

The laser-active region 30 follows the outlet 26, as already described, and this has a central axis 102 which is aligned coaxially to the central axis 90.

The laser-active region 30 is formed by a passageway 104 having a rectangular flow cross section and extending coaxially to the central axis 102. A flow cross section of the passageway 104 corresponds to a flow cross section of the outlet 26 of the supersonic nozzle. This flow cross section of the passageway 104 remains substantially constant over the entire extension of the passageway in the direction of flow 34 from the outlet 26 of the supersonic nozzle 20 to the inlet 42 of the diffuser 40. Gasdynamic surges can be avoided particularly well when the flow cross section of the passageway 104 expands slightly towards the diffuser 40.

The laser activity now takes place in this passageway 104, whereby the resonator beam path 32, insofar as it penetrates the passageway 104 with a plurality of branches, extends transversely to the central axis 102 and parallel to the longitudinal cross-sectional side 98 of the outlet and, therefore, parallel to an upper passageway wall 106 and a lower passageway wall 108 and exits from a rear passageway wall 110 and a front passageway wall 112 in order to impinge each time on the mirrors 36 or the mirrors 38.

The mirrors 36 and 38 form a folded resonator. The resonator beam path 32, proceeding from the mirror 36C, extends with a first branch transversely to the central axis 102 to the mirror 38C, from there to the mirror 38B with a second branch, from the mirror 38B transversely to the central axis 102 to the mirror 36B, from the mirror 36B to the mirror 36A and from there with a third branch transversely to the central axis 102 as far as the mirror 38A which is designed as a semi-permeable mirror and allows a laser beam 114 to exit.

In the inventive embodiment, the conditions defined by the supersonic nozzle 20 prevail in the laser-active region 30, i.e. a pressure of approximately 15 mbar and a temperature of 90 Kelvin, which are responsible for making a laser activity of the CO molecules in the laser gas possible.

The diffuser 40 follows the laser-active region 30 with the same flow cross section, parallel in the direction of both the long cross-sectional side 98 and of the short cross-sectional side 100, as that at the outlet 26 of the supersonic nozzle 20. Therefore, a long cross-sectional side 118 and a short cross-sectional side 120 of the inlet 42 to the diffuser 40 have identical dimensions to the long cross-sectional side 98 and the short cross-sectional side 100.

Following the inlet 42, the diffuser 40 tapers merely in the direction of the short cross-sectional side 120 but keeps its dimension in the direction of the long cross-sectional side 118. Preferably, the diffuser 40 also has a central axis 122 which is arranged coaxially to the central axis 102.

After flowing through the laser-active region, the laser gas enters the diffuser 40 at a temperature of approximately 90 Kelvin and a pressure of 15 mbar and experiences in the diffuser 40 an increase in pressure to a pressure of approximately 80 mbar and an increase in temperature to a temperature of approximately 395 Kelvin.

From the outlet 44 of the diffuser 40, the laser gas is cyclically returned to the supply line 12 in the laser gas circuit via the return line 46, the heat exchanger 48, the pump 50, the heat exchanger 52 and the $CO_2$ filter and from the supply line is fed again into the excitation region 10.

In this respect, the heat exchanger 48 causes a cooling of the laser gas prior to compression thereof to a pressure of approximately 500 mbar by the pump 50. The heat exchanger 52 again causes a cooling of the laser gas heated by the pump 50 to a temperature of approximately 295 Kelvin, at which the laser gas passes through the $CO_2$ filter 54 and is fed via the supply line 12 to the excitation region 10.

The present disclosure relates to the subject matter disclosed in German application No. P 40 28 053.5 of Sep. 5, 1990, the entire specification of which is incorporated herein by reference.

What is claimed is:

1. A gasdynamic CO laser comprising:
 an excitation region having a high frequency discharge within region;
 means for providing a high frequency discharge within said high frequency discharge region for exciting a laser gas supplied thereto;

a supersonic nozzle arranged downstream of said excitation region, said high frequency discharge region ending in front of the supersonic nozzle; and a laser active region penetrated by a resonator beam path downstream of said high frequcny discahrge region.

2. A gasdynamic CO laser in accordance with claim 1 wherein said supersonic nozzle has a nozzle throat with a flow cross section in the shape of an elongated rectangle or slit with a long and a short cross-sectional side.

3. A gasdynamic CO laser in accordance with claim 2 wherein said high-frequency discharge region extends in a direciton parallel to the long cross-sectional side of said nozzle throat with essentially the dimension thereof.

4. A gasdynamic CO laser in accordance wtih claim 2 wherein said high frequency discharge region extends in a direction parallel to the short cross-sectional side of said nozzle throat over an entry height of a front inlet of said supersonic nozzle.

5. A gasdynamic CO laser in accordance with claim 1 wherein said high frequency discahrge region has at an outlet side thereof a flow cross-section corresponding in form and dimensions to that of a front inlet of said supersonic nozzle.

6. A gasdynamic CO laser in accordnace with claim 1 wherien said high frequency discharge region is arranged with a central axis in alignment with a central axis of a nozzle throat of said supersonic nozzle.

7. A gasdynamic CO laser in accordance with claim 1 wherein said means for providing a high frequency discharge comprise two high frequency electrodes located oposite one another, with said high frequency discharge occurring between said electrodes.

8. A asdynamic CO laser in accordance with claim 7 wherein said high frequency electrodes generate an electrical field aligned approximately perpendicular to a direction of flow of said laser gas.

9. A gasdynamic CO laser in accordance with claim 7 wherein said high frequency electrodes extend parallel to a direction of a long cross-sectional side of a nozzle throat of said supersonic nozzle with a length along said direction that is substantially the same as that of said nozzle throat.

10. A gasdynamic CO laser in accordance with claim 7 wherien a plurlaity of high frequency electrodes are arranged in spaced relation one after the other in a direction of flow of said laser gas.

11. A gasdynamic CO laser in accordance with claim 7 wherein said high frequency electrodes are bar shaped.

12. A gasdynamic CO laser in accordance with claim 1 wherien said high frequency discharge is dielectrically stabilized.

13. A gasdynamic CO laser in accordance with claim 7 wherein said high frequency electrodes are provided with dielectric covers and said high frequency discharge is dielectrically stabilized.

14. A gasdynamic CO laser in accordance with claim 13 wherein said high frequency discharge region is enclosed between two dielectric plates located in planes aligned approximately parallel to a long cross-sectional side of a nozzle throat of said supersonic nozzle.

15. A gasdynamic CO laser in accordance with claim 1 wherein said laser gas flows through said high frequency discharge region at a pressure of approximately 400 to approximately 600 mbar.

* * * * *

UNITED STATES PATENT AND TRADEMARK OFFICE
CERTIFICATE OF CORRECTION

PATENT NO.  : 5,206,876
DATED       : April 27, 1993
INVENTOR(S) : von Buelow, et al.

It is certified that error appears in the above-identified patent and that said Letters Patent is hereby corrected as shown below:

In claim 1, at column 6, line 65, delete the word "within".

In claim 1, at column 7, line 5, change "frequcny discahrge" to -- frequency discharge -- .

In claim 4, at column 7, line 16, change "wtih" to -- with -- .

In claim 6, at column 7, line 27, change "wherien" to -- wherein -- .

In claim 7, at column 7, line 33, change "oposite" to -- opposite -- .

In claim 8, at column 8, line 1, change "asdynamic" to -- gasdynamic -- .

In claim 10, at column 8, line 12, change "plurlaity" to -- plurality --

In claim 12, at column 8, line 19, change "wherien" to -- wherein -- .

Signed and Sealed this

Fourth Day of January, 1994

Attest:

BRUCE LEHMAN

*Attesting Officer*     Commissioner of Patents and Trademarks